United States Patent
Orth et al.

(10) Patent No.: US 6,217,779 B1
(45) Date of Patent: Apr. 17, 2001

(54) DEHALOGENATION OF HALOGENATED HYDROCARBONS IN AQUEOUS COMPOSITIONS

(75) Inventors: Robert G. Orth, Cedar Hill; David E. McKenzie, House Springs; Sa Van Ho, St. Louis, all of MO (US)

(73) Assignee: Astaris LLC, St. Louis, MO (US)

( * ) Notice: Subject to any disclaimer, the term of this patent is extended or adjusted under 35 U.S.C. 154(b) by 0 days.

(21) Appl. No.: 09/065,090

(22) PCT Filed: Jul. 30, 1996

(86) PCT No.: PCT/US96/12437

§ 371 Date: Dec. 17, 1998

§ 102(e) Date: Dec. 17, 1998

(87) PCT Pub. No.: WO97/04868

PCT Pub. Date: Feb. 13, 1997

Related U.S. Application Data

(60) Provisional application No. 60/001,825, filed on Aug. 2, 1995.

(51) Int. Cl.⁷ ...................................................... C02F 1/70
(52) U.S. Cl. ...................... 210/757; 210/747; 210/908; 588/206
(58) Field of Search .................................. 210/747, 757, 210/749, 908, 909; 588/206

(56) References Cited

U.S. PATENT DOCUMENTS

| | | | |
|---|---|---|---|
| 2,726,271 | 12/1955 | Troyan et al. | 260/650 |
| 3,697,608 | 10/1972 | Bellis | 260/653.5 |
| 3,737,384 | 6/1973 | Sweeny et al. | 210/59 |
| 4,162,948 | 7/1979 | Yagii et al. | 204/80 |
| 4,219,419 | 8/1980 | Sweeny | 210/59 |
| 4,382,865 | * 5/1983 | Sweeny | 210/743 |
| 4,642,192 | 2/1987 | Heskett | 210/638 |
| 4,943,671 | 7/1990 | Dockner et al. | 585/642 |
| 5,096,600 | 3/1992 | Hoch | 210/751 |
| 5,197,823 | 3/1993 | Cutshall et al. | 405/128 |
| 5,266,213 | * 11/1993 | Gillham | 210/747 |
| 5,314,623 | 5/1994 | Heskett | 210/638 |
| 5,354,931 | 10/1994 | Jan et al. | 585/264 |
| 5,362,402 | 11/1994 | Haitko et al. | 210/757 |
| 5,362,404 | 11/1994 | Haitko | 210/757 |
| 5,391,305 | 2/1995 | Haitko | 210/757 |
| 5,398,756 | 3/1995 | Brodsky et al. | 166/248 |
| 5,411,664 | 5/1995 | Seech et al. | 210/602 |
| 5,575,926 | * 11/1996 | Haitko et al. | 210/757 |
| 5,608,112 | * 3/1997 | Schwartz | 564/415 |
| 5,744,045 | * 4/1998 | Yuen | 210/719 |
| 5,789,649 | * 8/1998 | Batchelor et al. | 588/206 |
| 5,868,941 | * 2/1999 | Gillham et al. | 210/747 |

FOREIGN PATENT DOCUMENTS

| | | |
|---|---|---|
| 1209412 | 8/1986 | (CA) . |
| 2041452 | 4/1991 | (CA) . |
| 9219545 | 11/1992 | (WO) . |

OTHER PUBLICATIONS

O'Hannesin, Stephanie F.; Gillham, Robert W. "A Permeable Reaction Wall For In Situ Degradation of Halogenated Organic Compounds" Forty–Fifth Canadian Geotechnical Society Conference 1992.

Abstract—Korte, Nic et al. "ORNL/MMES Research into Remedial Applications of Zero–Valence Metals 2: Bimetallic Enhancements" Presented Before the Division of Environmental Chemistry American Chemical Society 1995.

Abtract–Schreier, Cindy G. and Reinhard, Martin "Catalytic Dehydrohalogenation and Hydrogenation using $H_2$ and Supported Palladium as a Method for the Removal of Tetracholorethylene from Water" Presented Before the Division of Environmental Chemistry American Chemical Society 1995.

Wilson, Barbara H.; Ehlke, Theodore, A.; Imbrigiotta, Thomas E.; Wilson, John T. "Reductive Dechlorination of Trichloroethylene in Anoxic Aquifer Material From Picatinny Arsenal, New Jersey" *Prepared for Robert S. Kerr Environmental Research Lab* (1992) pp. 704–707.

Abstract—Siantar, P. Darsa et al. "Transformation of the Petsicide 1,2–dibromo–3–chloropropane (DBCP) and Nitrate By Iron Powder and By $H_2/Pd/Al_2O_3$" Presented Before the Division of Environmental Chemistry Amerian Chemical Society 1995.

* cited by examiner

Primary Examiner—Peter A. Hruskoci
(74) Attorney, Agent, or Firm—Thompson Coburn LLP

(57) ABSTRACT

A method for dehalogenation of aqueous compositions contaminated with halogenated aliphatic and alicyclic hydrocarbons is provided which comprises contacting an aqueous composition with an amount of a mixed metal composition effective to dehalogenate the halogenated aliphatic and alicyclic hydrocarbons at a temperature of at least 10° C., wherein the mixed metal composition comprises a second metal selected from the group consisting of copper, cobalt, nickel, molybdenum, bismuth, tin, lead, silver, chromium, palladium, platinum and gold deposited on an anchor metal consisting essentially of iron metal and wherein the amount of second metal in the mixed metal composition is an amount effective to increase the dehalogenation rate compared to use of iron alone, and the surface of the mixed metal composition has exposed iron metal.

6 Claims, No Drawings

DEHALOGENATION OF HALOGENATED HYDROCARBONS IN AQUEOUS COMPOSITIONS

This application claims priority to Provisional Application 60/001,825, filed Aug. 2, 1995, and is a 371 of PCT/US96/12437 filed July 1996.

BACKGROUND OF THE INVENTION

This invention relates to a method for the dehalogenation of halogenated aliphatic and alicyclic hydrocarbons in aqueous compositions. In one aspect, this invention relates to a method utilizing a mixed metal composition to dehalogenate halogenated aliphatic and alicyclic hydrocarbons in an aqueous composition. In another aspect, this invention relates to a method of contacting a mixed metal composition prepared by contacting a metal or a soluble metal salt with an anchor metal to deposit the metal on an anchor metal with a halogenated aliphatic and alicyclic hydrocarbon contaminated aqueous composition to dehalogenate the halogenated aliphatic and alicyclic hydrocarbon. In a further aspect, this invention is utilized in situ to dehalogenate halogenated aliphatic and alicyclic hydrocarbons in groundwater.

Halogenated aliphatic and alicyclic hydrocarbons, particularly chlorinated aliphatic and alicyclic hydrocarbons such as carbon tetrachloride, chloroform, trichloroethylene and tetrachloroethylene, have been widely used as chemical intermediates, solvents for dry cleaning of clothing, degreasing, and a variety of other applications. Halogenated aliphatic and alicyclic hydrocarbons are very stable and persistent in the environment, and are relatively toxic at low levels.

Over the years, halogenated aliphatic and alicyclic hydrocarbons have been accumulating in the environment, particularly in groundwater. As a result, pollution of water by chlorinated hydrocarbons has become an important environmental problem and contaminated groundwater represent a large portion of environmental action plans throughout the world.

It is known that chlorinated compounds can be degraded by reductive dechlorination, i.e. replacement of chlorine substituents by hydrogen. Evidence indicates that many of the chlorinated solvents are degraded under anaerobic conditions in sediments and in systems simulating anaerobic wastewater treatment. Current theory suggests that some of these anaerobic dechlorinations are not strictly biological in nature, but are catalyzed by metallic iron. While the use of iron in the dechlorination affords little environmental threat, its use suffers from certain problems.

Recently, Gillham and O'Hannesin disclosed in U.S. Pat. No. 5,266,213, a method for cleaning halogenated contaminants from groundwater. The process involves feeding contaminated groundwater through a trench containing a metal such as iron, under strict exclusion of oxygen, and over a lengthy period of time. Disadvantages of this system include the fact that large amounts of iron and substantial periods of time are needed for completion of the reactions.

In U.S. Pat. Nos. 4,219,419 and 4,382,865 (Sweeny), there is disclosed a system for treating the effluent created during the production of halogenated pesticides. In that process, the effluent water stream containing the halogenated waste material is required to be buffered to near neutral pH prior to passing the waste stream over a metal couple.

There is a need for an enhanced method for dehalogenating aliphatic and alicyclic hydrocarbons in contaminated aqueous solutions so as to diminish the amount of metallic iron needed to complete the dehalogenation. There is also a need for a dehalogenation method where the rate of dehalogenation is increased and innocuous reaction products are generated. It has now been found that a mixed metal composition prepared by contacting a metal or a soluble metal salt with an anchor metal to deposit the metal on an anchor metal while controlling the portion of the surface area of the anchor metal which has a second metal deposited thereon solves the above-described problems.

SUMMARY OF THE INVENTION

It is an object of the invention to provide an improved method for dehalogenating halogenated aliphatic and alicyclic hydrocarbons in aqueous compositions. It is a further object of the invention to provide a method for detoxifying groundwater contaminated with halogenated aliphatic and alicyclic hydrocarbons, particularly chlorinated aliphatic and alicyclic hydrocarbons. It is yet a further object of the invention to provide a method for dehalogenating halogenated aliphatic and alicyclic hydrocarbons in groundwater which can be used in situ, particularly in conjunction with in situ soil and groundwater remediation processes.

According to the invention, a method for dehalogenation of aqueous compositions contaminated with halogenated aliphatic and alicyclic hydrocarbons is provided which comprises contacting the aqueous composition with an amount of a mixed metal composition effective to dehalogenate the halogenated aliphatic and alicyclic hydrocarbons at a temperature of at least 10° C., wherein the mixed metal composition comprises a second metal deposited on an anchor metal consisting essentially of iron metal and wherein the amount of second metal in the mixed metal composition is an amount effective to increase the dehalogenation rate compared to use of iron alone, and the surface of the mixed metal composition has exposed iron metal.

In one embodiment, the mixed metal composition is prepared by contacting an anchor metal consisting essentially of iron metal with a soluble metal salt in the presence of a liquid comprising water for a time sufficient to deposit metal derived from the soluble metal salt on the anchor metal wherein the metal in the soluble salt is copper, nickel, molybdenum, tin, lead, silver, chromium, palladium, platinum or gold. In another embodiment, the mixed metal composition is prepared by contacting an anchor metal consisting essentially of iron metal with a second metal selected from the group consisting of copper and nickel in the presence of a liquid comprising water for a time sufficient to deposit the second metal on the anchor metal. In a further embodiment, the mixed metal composition is prepared by contacting an anchor metal consisting essentially of iron metal with a nonaqueous electroless plating solution comprising a soluble metal halide salt complex and a suitable solvent for a time sufficient to deposit metal derived from the soluble metal salt on the anchor metal wherein the metal in the soluble salt is cobalt, copper, nickel, bismuth or lead, and recovering the mixed metal composition.

DETAILED DESCRIPTION OF THE INVENTION

A first embodiment of the invention relates to a method for dehalogenation of aqueous compositions contaminated with halogenated aliphatic and alicyclic hydrocarbons comprising contacting an aqueous composition with an amount of a mixed metal composition effective to dehalogenate the halogenated aliphatic and alicyclic hydrocarbons at a temperature of at least 10° C., wherein the mixed metal composition comprises a second metal selected from the group consisting of copper, cobalt, nickel, molybdenum, bismuth, tin, lead, silver, chromium, palladium, platinum and gold deposited on an anchor metal consisting essentially of iron metal and wherein the amount of second metal in the mixed metal composition is an amount effective to increase the dehalogenation rate compared to use of iron alone, and the surface of the mixed metal composition has exposed iron metal.

A second embodiment of the invention relates to a method for dehalogenation of aqueous compositions contaminated with halogenated aliphatic and alicyclic hydrocarbons comprising: (a) contacting an anchor metal consisting essentially of iron metal with a soluble metal salt in the presence of a liquid comprising water for a time sufficient to deposit metal derived from the soluble metal salt on the anchor metal to produce a mixed metal composition wherein the amount of metal derived from the soluble metal salt in the mixed metal composition is an amount effective to increase the dehalogenation rate compared to use of iron alone, and the surface of the mixed metal composition has exposed iron metal, and wherein the metal in the soluble salt is copper, nickel, molybdenum, tin, lead, silver, chromium, palladium, platinum or gold, and (b) contacting the aqueous composition with an amount of the mixed metal composition effective to dehalogenate the halogenated aliphatic and alicyclic hydrocarbons at a temperature of at least 10° C.

A third embodiment of the invention relates to a method for dehalogenation of aqueous compositions contaminated with halogenated aliphatic and alicyclic hydrocarbons comprising: (a) contacting an anchor metal consisting essentially of iron metal with a second metal selected from the group consisting of copper and nickel in the presence of a liquid comprising water for a time sufficient to deposit the second metal on the anchor metal to produce a mixed metal composition wherein the amount of the second metal in the mixed metal composition is an amount effective to increase the dehalogenation rate compared to use of iron alone and the surface of the mixed metal composition has exposed iron metal, and wherein the amount of the second metal charged to form the mixed metal composition is about 0.08 weight percent to about 50 weight percent of the total amount of the second metal and the anchor metal charged; and (b) contacting the aqueous composition with an amount of the mixed metal composition effective to dehalogenate the halogenated aliphatic and alicyclic hydrocarbons at a temperature of at least 10° C.

In the second and third embodiments described above, steps (a) and (b) can optionally be performed simultaneously. Therefore, the mixed metal composition can be formed by contacting the anchor metal with the second metal in the presence of a liquid comprising water which is the contaminated aqueous composition.

A fourth embodiment of the invention relates to a method for dehalogenation of aqueous compositions contaminated with halogenated aliphatic and alicyclic hydrocarbons comprising: (a) contacting an anchor metal consisting essentially of iron metal with a nonaqueous electroless plating solution comprising a soluble metal halide salt complex and a suitable solvent for a time sufficient to deposit metal derived from the soluble metal halide salt on the anchor metal to produce a mixed metal composition wherein the amount of metal derived from the soluble metal halide salt in the mixed metal composition is an amount effective to increase the dehalogenation rate compared to use of iron alone, and the surface of the mixed metal composition has exposed iron metal, and wherein the metal in the soluble salt is cobalt, copper, nickel, bismuth or lead, (b) recovering the mixed metal composition, and (c) contacting the aqueous composition with an amount of the mixed metal composition effective to dehalogenate the halogenated aliphatic and alicyclic hydrocarbons at a temperature of at least 10° C.

The rate of dehalogenation will depend on several factors. Such factors include, but are not limited to, the second metal used, the amount of second metal in the mixed metal composition, the relative exposed surface areas of the second metal and iron, the type of iron, temperature, and the halogenated aliphatic and alicyclic hydrocarbon to be dehalogenated. The dehalogenation rate achievable by utilizing the mixed metal composition of the present invention is unexpectedly increased compared to the use of iron alone. Specifically, the increase in rate compared to the use of iron alone can be calculated and conveniently expressed using a Rate Enhancement Factor (REF) wherein $$REF = (t_{1/2,Fe} - t_{1/2,mixed\ metal\ composition})/t_{1/2,Fe}$$ or $$REF = (k_{mixed\ metal\ composition} - k_{Fe})/k_{mixed\ metal\ composition}.$$

In the above formulas, $t_{1/2}$ is the half-life, i.e. the time required for half of the halogenated aliphatic and alicyclic hydrocarbon in the aqueous composition to be dehalogenated, and k is the dehalogenation rate constant wherein $t_{1/2} = \ln(2)/k$. The half-life or rate constant using the mixed metal composition of the invention can be compared to the half-life or rate constant using iron metal alone and an improvement in dehalogenation rate can be readily determined. The Rate Enhancement Factor theoretically can vary from 0 to 1 with 0 representing no improvement and 1 representing an infinite improvement in rate. This compares directly to the dehalogenation rate enhancement calculated as a ratio of $k_{mixed\ metal}/k_{FE}$ or $t_{1/2},Fe/t_{1/2}$,mixed metal- wherein 1 corresponds to a REF of 0, and 100 corresponds to a REF of 0.99. The use of the mixed metal composition of the invention results in a REF of at least about 0.15 and up to about 0.99. It is preferred that the mixed metal composition be selected according to the factors of the second metal used, the amount of second metal in the mixed metal composition, the relative exposed surface areas of the second metal and iron, and the type of iron such that use of the mixed metal composition of the invention results in a REF of at least about 0.2 and up to about 0.96, more preferably at least about 0.35 and up to about 0.86, compared to the use of iron alone.

The invention can be practiced in different settings. The invention can be practiced ex situ by various methods, including but not limited to, batch processing or passing the contaminated solution through a column. In batch processing the contaminated aqueous composition is treated in a separate container by admixing the reagents with the contaminated solution. In column treatment, the mixed metal composition is packed as a reactive medium in the column while the contaminated solution is passed through the column.

Additionally, the method of this invention can be practiced in situ without the removal of the contaminated water from the ground, pond or stream. Contaminants can be degraded in place because the reaction products are environmentally acceptable and need not be removed. In situ treatment is currently preferred for treating contaminated soil or groundwater because the contaminated soil or groundwater does not require handling.

The method of this invention is particularly applicable in conjunction with the in situ remediation process disclosed in U.S. Pat. No. 5,398,756 (Brodsky and Ho), which is incorporated by reference herein. In one aspect of U.S. Pat. No. 5,398,756, material for treating contaminants is introduced into liquid permeable regions of a contaminated soil region to form treating zones and the contaminant is caused to flow through the treating zones via electroosmosis.

The method of the invention can also be practiced in situ utilizing a permeable reaction wall as disclosed in O'Hannesin and Gillham, "A Permeable Reaction Wall for In Situ Degradation of Halogenated Organic Compounds", paper presented at the 45th Canadian Geotechnical Conference, Toronto, Canada, Oct. 25–28, 1992 and commercially available as the envirometal process from enviro-metal technologies inc. The permeable reaction wall is installed across the flow path of a contaminant plume, allowing the plume to passively move through the wall. The halogenated hydrocarbons are degraded by reaction with the mixed metal composition incorporated in the permeable areas or gates of the permeable reaction wall. In addition, this technique can be used in conjunction with the process of U.S. Pat. No. 5,398,756 for low permeability soils.

The halogenated aliphatic and alicyclic hydrocarbons of the invention can contain a halogen selected from the group consisting of chlorine, bromine, fluorine and mixtures thereof. By mixtures thereof is meant halogenated aliphatic and alicyclic hydrocarbons which contain more than one type of halogen, e.g. chlorine and bromine. The currently preferred halogenated aliphatic and alicyclic hydrocarbons for use in the invention are those wherein the halogen is selected from the group consisting of chlorine, bromine and mixtures thereof. The most preferred halogenated hydrocarbons for use in the invention are halogenated aliphatic hydrocarbons, specifically chloroaliphatics, bromoaliphatics and bromo,chloroaliphatics. It is also preferred, regardless of the specific halogen, that the aliphatic hydrocarbon have 1 to 18 carbon atoms, preferably 1 to 12 carbon atoms, and the alicyclic hydrocarbons have 3 to 12 carbon atoms, preferably 5 to 8 carbon atoms.

Examples of suitable halogenated aliphatic and alicyclic hydrocarbons for treatment in the invention include, but are not limited to, carbon tetrachloride, 1,1-dichloroethane, trichloroethene, dibromochloromethane, cis-1,3-dichloropropene, tetrachloroethene, bromomethane, chloroform, 1,2-dichloropropane, bromodichloromethane, cis-1,2-dichloroethene, trans-1,3-dichloropropene, 1,1,1-trichloroethane, vinyl chloride, 1,1-dichloroethene, 1,1,2-trichloroethane, bromoform, trans-1,2-dichloroethene, 1,1,2,2-tetrachloroethane, chloroethane, 1,2,3,4-tetrachlorobutane, 1,2-dichlorocyclohexane, chlorocyclobutane, chlorocyclohexane, chlorocyclopentane, bromocyclopropane, bromocycloheptane, 1-chloro-1-cyclopentene and 3-bromocyclohexene.

The anchor metal of the invention consists essentially of iron metal. The anchor metal can be high purity iron metal, e.g. 99.999% purity, or a low carbon iron that contains a small amount, e.g. less than 1–2 weight percent, of other metal impurities that are incorporated within the iron particle and not readily or uniformly available at the surface of the iron particle. The major metal impurities in such an iron are chromium, manganese, nickel and copper.

In the embodiment where the metal deposited on the anchor metal is in the form of the metal, the metal is selected from the group consisting of copper and nickel. The currently preferred metal is copper for reasons of economics and performance.

In the embodiment where the metal deposited on the anchor metal is in the form of a soluble metal salt, the metal is selected from the group consisting of copper, nickel, molybdenum, tin, lead, silver, chromium, palladium, platinum and gold, preferably copper, nickel, tin and silver, more preferably copper, nickel and tin, and most preferably copper. Examples of suitable soluble metal salts include, but are not limited to, copper sulfate, copper chloride, copper nitrate, nickel sulfate, nickel chloride, silver sulfate, gold trichloride, stannous sulfate, stannous chloride, lead chloride, lead acetate, lead chlorate, lead nitrate, molybdenum trioxide, chromous chloride, palladium chloride and platinum sulfate. The currently preferred soluble metal salt is copper sulfate due to its excellent performance. When the deposition of the second metal on the anchor metal is conducted in an aqueous solution, the soluble metal salts can optionally be used in conjunction with any suitable complexing agent to enhance the deposition of the second metal on the anchor metal. Examples of suitable complexing agent include, but are not limited to, the salts of ethylenediaminetetraacetic acid (EDTA), particularly the sodium salts of EDTA.

In the embodiment where the metal deposited on the anchor metal is in the form of a soluble metal halide salt complex and the electroless deposition of the metal from the soluble metal halide salt complex on the anchor metal is conducted in a nonaqueous solution, the metal is selected from the group consisting of cobalt, copper, nickel, bismuth and lead, preferably cobalt, copper and nickel, and more preferably cobalt and copper. When the deposition of the metal from the soluble metal salt complex on the anchor metal is conducted in a nonaqueous solution, the metal halide salt is complexed with a basic nitrogen compound capable of forming a complex with the metal. The basic nitrogen compound can be added to the metal halide salt to form the complex as the hydrochloride of a nitrogen-containing base or as a mixture of the nitrogen-containing base and hydrochloric acid. Examples of nitrogen containing bases include inorganic bases such as hydrazine, hydroxylamine and ammonia, organic bases such as primary, secondary or tertiary amines and nitrogen-containing heterocyclic compounds, carboxylic acid amides, urea derivatives, e.g. N,N'-dimethyl urea, and basic phosphorus compounds, e.g. hexamethylphosphoric acid triamide. Examples of basic nitrogen compounds used as complexing agents include, but are not limited to, $NH_4Cl$, $H_3CNH_2 \cdot HCl$, $H_3CNH \cdot HCl$, morpholine hydrochloride, and pyridine hydrochloride. Examples of suitable metal halide salts include, but are not limited to, copper chloride, nickel chloride, cobaltous chloride, lead chloride and bismuth chloride. The currently preferred metal halide salts are cobaltous chloride and copper chloride. The solvent used to prepare the nonaqueous solution of the soluble metal halide salt complex is any organic solvent capable of dissolving the metal halide salt complex. Examples of suitable polar, non-aqueous solvents are dimethylformamide, acetamide, N-methyl-2-pyrrolidone, cyclohexanone, dimethylsulfoxide, tetrahydrofuran, and mixtures thereof. The currently preferred organic solvent is dimethylsulfoxide. The formation of the soluble metal halide salt complex and the electroless plating of the soluble metal halide salt complex on iron is described in Canadian Patent No. 1,209,412 (Hans-Georg Schnering et. al.).

The mixed metal composition of the invention comprises a second metal having a more positive reduction potential than that of metallic iron deposited on the surface of an anchor metal consisting essentially of iron metal. The second metal is selected from the group consisting of copper, cobalt, nickel, molybdenum, bismuth, tin, lead, silver, chromium, palladium, platinum and gold. The amount of the second metal in the mixed metal composition is an amount effective to increase the dehalogenation rate compared to use of iron alone and the surface of the mixed metal composition has exposed iron metal. The amount of the second metal in the mixed metal composition can be conveniently expressed as a weight percent of the total amount of metal in the mixed metal composition. Typically, the weight percent of the second metal in the mixed metal composition will be from about 0.08 weight percent to about 10 weight percent, preferably about 0.12 weight percent to about 5 weight percent, and most preferably about 0.14 weight percent to about 1 weight percent. When the second metal is charged as the metal, the amount of the second metal charged to form the mixed metal composition is based on the total amount of the second metal and the anchor metal charged and is about 0.08 weight percent to about 50 weight percent, preferably about 0.5 weight percent to about 50 weight percent, and most preferably about 1 weight percent to about 10 weight percent, such as about 5 weight percent.

It is important in the method of the invention that the amount of the second metal on the surface of the anchor metal be controlled, i.e. that the percentage of the surface area of the anchor metal that is covered by deposited second metal be controlled. The surface of the mixed metal composition of the invention is required to have exposed iron metal. The amount of surface area covered by the second metal will effect the rate of dehalogenation achievable by the mixed metal composition of the invention, i.e. the ratio of surface area of second metal to exposed surface area of iron will effect the rate of dehalogenation. Therefore, in conjunction with the amount of second metal in the mixed metal composition, the percentage of the surface area of the mixed metal composition which is the second metal is controlled to achieve an increase in dehalogenation rate compared to the use of iron metal alone.

The dehalogenation reaction is readily carried out under ambient temperature, although temperature as low as 10° C. can be utilized. When temperatures lower than ambient temperature are used, the reaction rate, i.e. dehalogenation rate, is slower. When temperatures above ambient temperature are employed, such as temperatures up to about 350° C., the reaction rate is generally faster. When the dehalogenation reaction is conducted in situ, the upper limit of temperature will generally be about 70° C.

EXAMPLES

Example 1

Materials List—Mixed Metal Experiments

High purity iron (99.999%) obtained from Aesar

Mallinckrodt iron 100 mesh obtained from Mallinckrodt Chemical, Inc.

Stannous Chloride purchased from Mallinckrodt Chemical, Inc.

Copper Metal electrolytic dust obtained from Fisher Scientific

Nickel reduced powder obtained from Fisher Scientific

Magnesium metal (40–80 mesh) obtained from Fisher Scientific

Tin powder certified obtained from Fisher Scientific

Zinc granular 30 mesh obtained from Fisher Scientific

Cobalt powder obtained from Fisher Scientific

Trichloroethylene (99+%) obtained from Aldrich Chemical Company 12 mL National Scientific Company vials with Teflon®/silicone septum obtained from Fisher Scientific Tube Rotator obtained from Scientific Equipment Products Experimental A Batch experimental approach was used in the mixed metal studies. Initially, Aesar pure iron (1 g) was weighed into eight 12 mL vials equipped with Teflon® faced septa. The other metal (tin, copper, zinc etc.) was then weighed into the appropriate vial. These weights were held constant at 0.05 g per other metal. A water solution was then prepared by combining 250 mL water and 50 $\mu$L 88% formic acid. 10 mL of this water was then pipetted into each vial. Each vial was then spiked, subsurface with 0.5 $\mu$L Trichloroethylene (TCE) with a 5 $\mu$L Hamilton syringe. Immediately after spiking, the vials were capped. Vials were then placed on a tube rotator at 18 RPM. A reagent blank also containing 1 g. Aesar iron and no TCE and a simulated spike containing the reagent water and TCE was also placed on the rotator. The experiment was started and the vials were sampled periodically over the approximate 6.26 days of the experiment by removing 100 $\mu$L of the solution with a repeater pipette and placing it directly into 10 mL of hexane. After sampling the group of sample vials, the vials were placed back onto the sample rotator until the next sampling period.

In each batch experiment, a set of samples were run so relative comparisons could be made within a set. The samples consisted of a comparative sample vial with Fe metal for which the comparison was to be made at a certain mass, a control sample vial containing TCE but no metals, and the mixed metal samples. Since TCE has a relatively large partial pressure in water, all rates were determined relative to the vial containing TCE and no metal. This vial is referred to as the simulated spiked sample. Each point was then plotted relative to the loss of TCE in the control. As such, the measured concentration of a reaction was divided by the measured concentration in the simulated spike to correct for volatility losses for each sampling time. $C_o$ can be defined as the initial concentration determined for a reaction mixture corrected for volatility losses at each sampling time. $C_i/C_o$ is the normalized concentration of the reaction versus the simulated spiked sample, where Ci is the measured concentration of the reaction mixture. The simulated spiked sample was sampled each time the reaction mixtures were sampled and this correction was made for each reaction mixture data point. The control was assumed to have the same loss during sampling as the samples. The mass of the metal was always maintained the same within a set of experiments, since the rates depend on surface area and therefore the mass used such that the comparisons of rate increases are made against a control of Fe having the same mass.

Analytical procedures

The analysis for TCE was typically carried out on a gas chromatograph equipped with an electron capture detector (GC/EC). This is a highly sensitive technique for determination of chlorinated compounds. The gas chromatograph was an HP 5890 equipped with a 30 meter×0.53 mm Supelco 2 5320 column. The temperature program was; initial temperature was 40 C. held for 4 minutes followed by an increase to 65 C. at a rate of 10 degrees per minute followed by an increase to 200 C. at a rate of 30 degree per minute. The output of the GC/EC was controlled by a Dionex data system. Quantitation was carried out against a standard curve.

Results

The ln $C_i/C_o$ was plotted vs time. The plots indicated if the rate was a pseudo first order reaction. All the reactions were pseudo first order and therefore comparisons based on pseudo first order half lives could be made. This was accomplished by fitting the data with a linear least squares fit and obtaining the rate constant k for the mixed metal. The half-lives ($t_{1/2}$) were calculated from $t_{1/2}=\ln(2)/k$.

Table I shows the half-lives calculated by this approach as well as the improvement in dehalogenation rates. The results in Table I indicate that the addition of copper decreases the time to dechlorinate half of the TCE to 10 hours from 69 hours observed for pure Fe. Table I also indicates that the dechlorination of TCE the decrease in half-life with the addition of Cu metal is independent of the amount of metal added over the range tested, i.e. 0.5% by weight of Cu on Fe yields within experimental error the same half-life as mixtures of Fe and Cu containing 25% and 50% Cu. The results in Table I also demonstrate that the presence of Ni metal decreases the half-life of the loss of TCE. That Cu and Ni increase the rate suggests that any metal that has a more positive reduction potential than iron will increase the rate of loss of halogenated hydrocarbons such as TCE. This observation holds only if the metals with more positive potentials can plate on the iron or through a mechanical mechanism be placed in contact with the iron. The process of plating can occur through the dissolution of the metal which immediately plates on the surface of the iron because of the positive reduction potential with respect to iron. This was seen with the Cu and Ni which have higher reduction potentials than the Fe. The contact causes a cathodic and anodic potential to occur at the surface increasing the rate of loss of TCE. The rate increases for Cu was about 7 times that observed for pure iron. For Ni, the rate increase was about 1.6 times with respect to iron. If the contact with the surface cannot occur then the increase of the rate of loss of TCE will not occur. Sn and Co have more positive reduction potentials did not give an increase in rate of loss with respect to Fe. These metals can be placed directly on the surface by using salts. The metals will plate because they have a higher reduction potential then the Fe metal. These metals could also be placed on the surface of iron through the use of sputtering techniques. Once placed directly on the surface, a rate increase in dehalogenation of TCE should occur.

To show that the plating directly would improve the rate of loss of TCE, 0.1 g of $SnCl_2 \cdot 2 H_2O$ was dissolved in 0.01N HCl solution. 30 grams of Mallinckrodt iron (40 mesh) was placed in 100 mL of water and stirred rapidly under a blanket of nitrogen. The $Sn^{+2}$ solution was added rapidly to the stirred reactor. This process plated Sn onto the surface of the iron. The amount of tin was calculated to give a surface coverage much less than a monolayer based of a surface area of the iron of 0.5 m²/g as determined by BET measurements. The nitrogen was necessary since the exposed iron surface will corrode at an accelerated rate with a partial coverage of Sn. The water was removed from the reactor and the tin plated iron washed several times with water followed by acetone. The tin plated iron was dried under a stream on nitrogen. The experiment was run against Mallinckrodt iron (40 mesh) having no Sn plated with a TCE control which contained no metal. The control contained 200 ppm of TCE and this was placed in a 12 mL vial and capped with a Teflon® line top. 7 grams of the tin plated iron was placed in a second 12 mL vial and the vial filled with 200 ppm TCE solution so that no headspace existed. To a third 12 mL vial, 14 grams of the tin plated iron was added and filled to the top with 200 ppm solution of TCE. To a fourth 12 mL vial, 7 grams of the iron was added and the vial filled with 200 ppm solution of TCE. The iron was prepared the same as the tin:iron except that no tin was added to the stirred reactor.

TABLE I

Half-lives for mixed metal experiments

| Sample | Half-Life (hours) | REF | Rate Increase[b] |
|---|---|---|---|
| 99.999% Fe | 69 | — | — |
| Fe:Cu (0.5% Cu)[a] | 9.8 | 0.86 | 7 |
| Fe:Cu (25% Cu) | 10 | 0.86 | 6.9 |
| Fe:Cu (50% Cu) | 9.5 | 0.86 | 7.3 |
| Fe:Ni | 44 | 0.36 | 1.6 |
| Fe:Co | NDL | — | — |
| Fe:Sn | NDL | — | — |
| Fe:Zn | NDL | — | — |
| Fe:Mg | NDL | — | — |

[a]duplicate samples run
[b]rate increase = $t_{1/2, Fe}/t_{1/2, mixed\ metal\ composition}$ (# times increased)
NDL = no detectable loss of TCE during experiment Table II shows the results of the plating of tin onto iron. The tin plate increases the rate by a factor of 7. Table II also shows that the rate depended on the amount of tin plated iron used indicating a surface dependence. This indicates that in the metal mixture reported in Table I that no plating or surface contact was occurring in the Fe:Sn mixture.

TABLE 2

Rate increase due to tin plated on iron

| Sample | Half-Life (hours) | TCE Concentration @ 24 hours (ppm) | REF | Rate Increase[a] |
|---|---|---|---|---|
| Fe (7g) | 49 | 143 | — | — |
| Sn:Fe (7g) | 7 | 19 | 0.86 | 7 |
| Sn:Fe (14g) | 2 | 0.04 | 0.96 | 24.5 |
| TCE (control) | — | 190 | — | — |

[a]rate increase = $t_{1/2, Fe}/t_{1/2, mixed\ composition}$ (# times increased)

Example 2

Materials list/Priority Pollutant Standard

Volatile Priority Pollutant Standards obtained from Restek Corporation (Catalogue numbers 30007, 30008, 30009, and 30010) with each component at 2000 μg/mL. Individual halogenated compounds are listed in Table II containing a comparison of half-lives between different mixtures of copper metal or copper sulfate with iron.

Iron powder (100 mesh) from Mallinckrodt Chemical, Inc.—99.2% purity

Formic Acid (88%) obtained from Fisher Scientific

Teflon® Caps obtained from fisher Scientific 4 oz bottle obtained from Fisher Scientific Cupric sulfate pentahydrate obtained from Fisher Scientific Copper metal obtained from Fisher Scientific Experimental Restek calibration standards Mix 2 through 5 were combined resulting in a 500 ppm mixture of the volatile priority pollutants. One liter of Milli-Q water was spiked with 48 μL 88% formic acid to be used as reagent water. Mallinckrodt Iron (6 g) was weighed into four 4 oz (119 mL) sample bottles. One bottle was chosen as a control containing no iron and only water and the volatile priority pollutants.

Copper metal (1 g) was weighed into one bottle containing iron, and cupric sulfate pentahydrate (1.26 g and 0.44 g) was weighed into two other bottles containing iron. Another bottle containing no iron was selected to serve as a simulated spiked sample. To each bottle, 100 mL of reagent water were added. The bottles were capped and shaken. Each reaction mixture was uncapped and spiked subsurface with 400 uL of the volatile priority pollutant standard mixture and capped. The bottles were placed on a Lab Line Orbit Environ Shaker and rotated at 150 RPM. Vials were removed for sampling and 2 mL were removed and added to a 1.5 mL autosampler vial equipped with Teflon® Faced septum. The auto sampler vials were filled until they overflowed and were then capped to minimize headspace. This was done to minimize loss of the highly volatile components. Reaction mixtures were sampled at 23.13 hours, 46.78 hours, 54.38 hours, and 71.66 hours respectively.

In each batch experiment, a set of samples were run so that relative comparisons could be made within a set. The samples consisted of a comparative sample vial with Fe metal for which the comparison was to be made at a certain mass, a control sample vial containing the volatile organic priority pollutants but no metals, and the samples with Fe and Cu or Cu salts. Because many of these compounds have a relatively large partial pressure in water it was necessary that all rates be determined relative to the vial containing water, the compounds and no metal. This vial is referred to as the simulated spiked sample. The mass of the metal in the samples was always maintained the same within a set of experiments, since the rates depend on surface area and therefore the mass used such that the comparisons of rate increases are made against a control of Fe having the same mass. The same procedure for determining rate of the reaction was carried out in these experiments as in the experimental procedure for the metal mixtures (Example 1). Plots of ln $C_i/C_o$ versus the sampling times indicated pseudo first order rates. Linear least squares fit of the data provide the rate constants and from the rate constants' half-lives can be calculated using $t_{1/2}=\ln(2)/k$. In some cases the reactions were so rapid that only one data point could be obtained. In these cases the reaction was assumed to be pseudo first order and a rate constant and half life calculated from that point. In some cases the reaction was so rapid that at the first sampling time of 23.13 hours there was no detectable signal. Again the reaction was assumed to be pseudo first order and a maximum rate constant and half-life calculated based on the detection limit for that compound. For both of these cases the half-lives are indicated with a less than symbol.

Analytical procedures

Analysis were performed using a Tekmar Liquid Sample Concentrator LCS-2 interfaced with a Hewlett Packard 5890 gas chromatograph with a Hewlett Packard 5970 mass selective detector. This technique is referred to as purge and trap analyses. Generally, the technique involved adding 0.3 mL of the samples from the 1.5 mL autosampler vials to 10 mL purge and trap tubes which had 5 mL deionized water in them, which were then sequentially sparged with 30 mL/minute helium onto a Supelco-1-2547 1% SP-1000 60/80 mesh carbopack B 8"×⅛" stainless steel trap column at 27 degrees C. The trap column was desorbed for 8 minutes at 200° C. onto the chromatographic column which was held at 10° C. during the desorb cycle.

Separation was performed using a 30 m J&W DB-624 0.53 mm I.D. with 0.25 $\mu$M film thickness column. The chromatographic conditions employed were a starting temperature of 10° C. which was held for 6 minutes followed by ramping the oven at 10 degrees per minute until 200° C. The oven was held at the final temperature for 5 minutes.

Mass spectral data was collected from 30 to 350 amu for the duration of the each run. Concentrations were determined by comparing the results to a standard curved using a Hewlett Packard UNIX based data system equipped with Throughput Target data reduction software.

Results

Table III shows the half-lives and improvement in dehalogenation rate obtained for each compound in the chemical mixture for the different Fe and Fe/Cu combinations. The results demonstrate that halogenated aromatics, i.e. benzene and chlorobenzene, did not show any loss for any combination indicating that these compounds are not affected by the Fe or the Fe/Cu combinations under the conditions studied. The Fe:Cu metal mixtures generally showed a detectable increase in the rate of dehalogenation as indicated by a lower half-life for most of the compounds when compared to iron. Where the Fe/Cu combinations showed no detectable loss (NDL), there may have been an improvement in the chlorinated compounds but the experiment was not run long enough to detect loss of these compounds with Fe or the Fe/Cu combination. For example 1,2-dichloroethane showed no detectable improvement for the Fe alone and Fe:Cu metal mixture. For the halogenated aliphatics where there was NDL, it is believed that a loss would have been detected if the experiment was run for a longer time. In the cases where there was NDL for the Fe alone, the % improvement has not been calculated. In the case of bromodichlormethane and bromoform, the dehalogenation occurred so rapidly that the differences between the results were within the detection limits of the GC analysis.

The addition of $CuSO_4.5H_2O$ to the water containing Fe causes the Cu to plate onto the Fe surface. The more $CuSO_4.5H_2O$ added to the solution the more Cu that plates onto the Fe surface. Therefore there is more Cu plated onto the Fe surface for 1.2 g $CuSO_4.5H_2O$ as compared to the 0.44 g $CuSO_4.5H_2O$. In comparing the $CuSO_4.5H_2O$ experiments with the Fe and the Fe:Cu in Table III, it can be seen that the Fe:Cu combinations generally showed significant improvement for the rate of dehalogenation compared to the Fe alone. For many of the halogenated compounds, the improvement was that the rates went from a no detectable loss over the time period of the experiment to half-lives that were less than 4 hours. Where measured comparisons could be made between the Fe and the Fe:$CuSO_4.5H_2O$ (1.2 g) the improvement in rate was >20 times that observed for Fe alone. Also noted in Table III is that where detectable half-lives were measured, the comparison between the $CuSO_4.5H_2O$ (0.44 g) and $CuSO_4.5H_2O$ (1.2 g) showed a longer half life for the lower coverage. One exception to that was with 1,2-dichloroethane where the half-life increased for the higher coverage Fe:$CuSO_4.5H_2O$ (1.2 g). It is unclear why this was the case. Chloromethane showed no improvement when comparing the metal mixture of Fe:Cu and the Fe:$CuSO_4.5H_2O$ mixtures. Part of the reason was the high volatility of this compound which made the uncertainty in the half-lives large and makes comparisons difficult.

The results of these experiments demonstrate that significant increases in rates can be obtained by plating Cu onto Fe. The rate increases can be as high as 20 times, e.g. up to a 96.4% improvement in dehalogenation rate. The amount of Cu on the Fe surface affects the rate and an improvement was generally noted as the amount of Cu was increased.

TABLE III

Comparison of half-lives[d] ($t_{1/2}$) for Dehalogenation of Various Halogenated Organics

| Sample | Fe $t_{1/2}$ | Fe with Cu metal $t_{1/2}$ | Fe with Cu metal REF | Fe with Cu metal inc[a] | Fe with $CuSO_4 \cdot 5H_2O$ (1.2 g) $t_{1/2}$ | Fe with $CuSO_4 \cdot 5H_2O$ (1.2 g) REF | Fe with $CuSO_4 \cdot 5H_2O$ (1.2 g) inc[a] | Fe with $CuSO_4 \cdot 5H_2O$ (0.44 g) $t_{1/2}$ | Fe with $CuSO_4 \cdot 5H_2O$ (0.44 g) REF | Fe with $CuSO_4 \cdot 5H_2O$ (0.44 g) inc[a] |
|---|---|---|---|---|---|---|---|---|---|---|
| 1,1,1-trichloroethane | 22 | 10 | 0.55 | 2.2 | <4[b] | >0.82 | >5.5 | <4[b] | >0.82 | >5.5 |
| 1,1,2,2-tetrachloroethane | 112 | 8 | 0.93 | 14 | <4[b] | >0.96 | >28 | <4[b] | >0.96 | >28 |
| 1,1,2-trichloroethane | NDL | 12 | — | — | <4[b] | — | — | <6[b] | — | — |
| 1,1-dichloroethane | NDL | 37 | — | — | 17 | — | — | NDL | — | — |
| 1,2-dichloroethane | NDL | NDL | — | — | 21 | — | — | 32 | — | — |
| 1,1-dichlroroethene | 49 | 18 | 0.63 | 2.7 | <3[b] | >0.94 | 16.3 | 8 | 0.84 | 6.1 |
| cis-1,2-dichloroethene | NDL | NDL | — | — | 4 | — | — | 8 | — | — |
| trans-1,2-dichloroethene | NDL | 42 | — | — | <1[b] | — | — | 4 | — | — |
| trichloroethene | NDL | 102 | — | — | 7 | — | — | 32 | — | — |
| tetrachloroethene | NDL | 52 | — | — | 10 | — | — | 35 | — | — |
| vinylchloride | NDL | 64 | — | — | 5 | — | — | 6 | — | — |
| bromodichloromethane | 5 | 8 | (60) | 0.63 | <4[b] | >0.2 | >1.3 | <4[b] | >0.2 | >1.3 |
| bromoform | <6[b] | <5[b] | 0.17 | 1.2 | <4[b] | 0.33 | 1.5 | <4[b] | 0.33 | 1.5 |
| bromomethane | 62 | 21 | 0.66 | 3. | 20 | 0.68 | 3.1 | 19 | 0.69 | 3.3 |
| carbon tetrachloride | 23 | 10 | 0.57 | 2.3 | <5[b] | >0.78 | >4.6 | <5[b] | >0.78 | >4.6 |
| chloromethane | NDL | 164 | — | — | 146 | — | — | 93 | — | — |
| cis-1,3-dichloropropene | 8 | 9 | (12.5) | 0.89 | <3[b] | >0.63 | >2.7 | <3[b] | >0.63 | >2.7 |
| trans-1,3-dichloropropene | 14 | <10[b] | >0.29 | >4.7 | >1.4 | <3[b] | >0.79 | >4.7 | <3[b] | >0.79 |
| methylene chloride | NDL | NDL | — | — | 69 | — | — | NDL | — | — |
| benzene[c] | NDL | NDL | — | — | NDL | — | — | NDL | — | — |
| chlorobenzene[c] | NDL | NDL | — | — | NDL | — | — | NDL | — | — |

NDL = No detectable Loss
[a]rate increase = $t_{1/2, Fe}/t_{1/2, mixed\ metal\ composition}$ (# times increased)
[b]half-lives were determined using detection limits and assuming pseudo first order rates or on one detectable point.
[c]comparative run
[d]half-lives reported in hours.

Example 3

Materials list: Coverage Study and the use of other more positive reduction metals Iron powder (100 mesh) from Mallinckrodt Chemical, Inc.—99.2% purity Teflon® Caps obtained from Fisher Scientific 8 mL bottle obtained from Fisher Scientific Cupric sulfate pentahydrate obtained from Fisher Scientific Tube Rotator obtained from Scientific Equipment Products Cupric nitrate dihydrate obtained from Fisher Scientific B&J Hexane Trichloroethylene (99+%) obtained from Aldrich Chemical Company 8 mL National Scientific Company vials with Teflon®/silicone septum obtained from Fisher Scientific $Ag_2SO_4$ purchased from Aldrich Chemical Company $AuCl_3$ purchased from Aesar Experimental The study with the mixtures of halogenated compounds indicated that the amount of Cu on the iron surface affects the rates of the dehalogenation reaction, i.e. as the amount increased the rate increased. In those experiments no effort was made to coat the Fe surface uniformly. Thus how the coverage specifically affected the rates could not be easily determined. To specifically test this effect the following experiment to control the coverage was conducted.

The plating of Cu metal on Fe was carried out in a way to try to obtain a uniform plating of the iron. To do this any technique used must maintain a highly stirred system. To plate the iron, $CuSO_4.5H_2O$ was dissolved in water. The $Cu^{+2}$ was agitated rapidly as 30 grams of Mallinckrodt Iron were added to the solution. The amount of $Cu^{+2}$ to be plated was varied so that the coverage of the iron would be less than a monolayer to well over a monolayer. In determining the concentration of $Cu^{+2}$ to use it was assumed that the Cu atom on the surface was a sphere with an atomic radii of 1.1 angstroms. The surface area of the iron as determined by BET measurements using Ar gas was 0.5 m$^2$/g for a total of 15 m$^2$ for the 30 grams of Fe. Thus 0.1 grams of $CuSO_4.5H_2O$ would theoretically yield 0.59 of a total monolayer coverage of the surface. Considering that Cu can plate on itself this coverage is an overestimate of the coverage and the actual coverage was <0.59 of a monolayer coverage of the surface. The 1.1 gram $CuSO_4.5H_2O$ sample should theoretically increase the coverage to 7 monolayers and the 5 grams $CuSO_4.5H_2O$ sample should theoretically give a coverage of 30 monolayers. However, the preference for Cu to plate on itself results in samples with <7 and <30 monolayers respectively. The coverage was confirmed by visual inspection of the iron. With less than a monolayer (theoretically) the Cu is not visible (<0.59 monolayer run). As the coverage increases the Cu red color begins to appear. At the highest coverage the metal surface appears to be copper with some iron present. At a coverage below a monolayer rapid corrosion of the iron begins if oxygen is present. To slow this process the plating was carried out under a nitrogen blanket.

TCE standards of 730 ppm solution were made by adding 125 μL TCE to 250 mL water. Cu coated Fe (5 g) was weighed into an 8 mL vial. This was repeated for each of the three different Cu plating concentrations. Another bottle containing no iron was selected to serve as a simulated spiked sample. A vial containing the 5 grams of iron treated in the same manner as the Cu coated but containing no Cu was prepared so that comparison of the rates could be made. To each vial TCE solution was added to the top and capped. The bottles were placed on a Tube Rotator and rotated at 18 RPM. Vials were removed for sampling and 0.1 mL removed and extracted into hexane following the procedure outlined in Example 1.

Data were examined in the same manner described in the previous studies. That is plots of ln $C_i/C_o$ versus the sampling times indicates pseudo first order rates. Linear least squares fit of the data provide the rate constants and from the rate constants' half-lives were calculated using $t_{1/2}=\ln(2)/k$.

Analytical procedures

Determination of the concentration of TCE was carried out using the methods described in the analytical section of Example 1. Chloride determinations were made using Capillary Zone Electrophoresis (CZE) methods provided by Dionex. The CZE instrument was a CZE Dionex CES 1.

TABLE IV

Variation in half-life as Cu Coverage Increases

| Calculated Monolayer on Fe surface | Observed half-life (hours) | REF | Rate Increase[a] |
|---|---|---|---|
| 0 | 111 | — | — |
| <0.59 | 30 | 0.73 | 3.7 |
| <7 | 37 | 0.67 | 3 |
| <30 | 48 | 0.57 | 2.3 |

[a]rate increase = $t_{1/2, Fe}/t_{1/2, mixed\ metal\ composition}$ (# times increased)

Another copper salt tried was $Cu(NO_3)_2 2H_2O$. Table V indicates that the use of this salt provided the $Cu^{2+}$ ions in solution for plating on Fe. The use of the nitrate salt makes it more difficult to control the uniformity of the Cu plating because of the nitrate oxidation potentials. This can be seen in Table 5 by the increase in rates as the amount of $Cu(NO_3)_2.2H_2O$ used with 30 grams of Fe increased. At similar levels using the $CuSO_4.5H_2O$ the iron took on the appearance of Cu. With the $Cu(NO_3)_2.2H_2O$ the Cu could not be seen on the surface of the Fe. This means that the amount of Cu salt used to give the optimum coverage will vary with the salt used. Table V also shows the chloride produced during the reaction time indicating that, within experimental error, 3 moles of $Cl^-$ was produced for each mole of TCE lost indicating a stoichiometric dechlorination. Headspace studies indicated that the carbon products were ethene, ethane, propene, propane, and small amounts of $C_4$ to $C_6$ hydrocarbons. The carbon balance was found to be greater than 90% base on these measured hydrocarbons.

TABLE V

Observed half-life for Cu Plated on Fe Using $Cu(NO_3)_2 \cdot 2H_2O$

| Sample (g $Cu(NO_3)_2 \cdot 2H_2O$ added to 30 g Fe) | half-life (hours) | REF | inc[a] | Amount TCE Lost μmole/mL | Amount Cl Produced μmole/mL | Mole Ratio Cl / TCE |
|---|---|---|---|---|---|---|
| Fe | 149 | — | — | 1.77 | 5.5 | 3.1 |
| Fe:Cu (0.1 g) | 63 | 0.58 | 2.4 | 3.1 | 6.6 | 2.1 |
| Fe:Cu (1. g) | 51 | 0.66 | 2.9 | 3.6 | 12.6 | 3.5 |
| Fe:Cu (5. g) | 12 | 0.92 | 12.4 | 5.28 | 14.7 | 2.8 |

[a]rate increase = $t_{½, Fe}/t_{½, mixed\ metal\ composition}$ (# times increased)

Results

Table IV shows the pseudo first order half-lives for each of the experiments. As can be seen from the results in Table IV the rate increases for a coverage less than half of the surface. As the coverage increases the rate begins to slow until at the highest coverage examined the rate has decreased to 40% of the highest rate observed in this series. Higher increases in rates with respect to iron were observed for the studies involving the mixture of halogenated compounds. But the coverage was not carefully controlled and the amount of available iron surface was probably larger. This would indicate that the 0.59 monolayer coverage would not be the maximum rate and thus the rate for lower coverage would be faster. Studies with pure Cu metal with no Fe present showed no loss of TCE over time periods of 100 hours. This clearly indicates that once the iron is completely covered by many monolayers of Cu the dehalogenation reaction would not occur. In addition, this clearly indicates that the <7 and <30 monolayer samples had surfaces with available iron, i.e. the iron surface was not completely coated with copper.

Salts of Ag and Au were also examined. These metals have a higher reduction potential than Fe and therefore should plate onto iron. The amount of Ag and Au salt used was calculated to be sure that the coverage of the surface would not exceed 1 monolayer for 30 grams of Fe. For this study, the Fe:Cu with a coverage calculated to be <0.59 monolayers (Table IV) was utilized. As in all studies, an Fe control was run along with a simulated spike. These experiment were run in the same manner as the previous experiments except that 10 grams of metal were added to the 8 mL vials. The half-lives were determined from the pseudo first order rate constants are shown in Table VI. As the amount of metal is increased the rate increases. The rate for the Fe:Cu (<0.59 monolayers) was faster than that observed when 5 grams were used (see Table IV). The same occurred for the Fe. Ten grams of iron had a half-life of 53 hours compare with the 111 hours shown for 5 grams in Table IV. The rates for the Ag and Au both show a marked increase over the Fe. The improvement is comparable to that observed for the Fe:Cu.

TABLE VI

Half-life: Metals Plated on Iron

| Sample | Half-life (hours) | REF | Rate Increase, # times increased $t_{1/2, Fe}/t_{1/2, mixed\ metal\ composition}$ |
|---|---|---|---|
| Fe | 53 | — | — |
| Fe:Cu (<0.59 monolayer) | 17 | 0.68 | 3.1 |
| Fe:Ag | 10 | 0.81 | 5.3 |
| Fe:Au | 17 | 0.68 | 3.1 |

In addition to the experiments for coverage of Cu on iron, experiments to examine the dechlorination rates of a cyclic alkane were conducted. The compound studied was trans-1,2-dichlorocyclohexane (DCC) obtained from Aldrich Chemical Co. The experiment was run against Mallinckrodt iron 40 mesh having no Cu plated. A control containing 50 ppm of DCC but no metal was placed in an 8 mL vial. Ten grams of the iron was placed in an 8 mL vial and the vial filled with 400 ppm DCC solution so that no headspace existed. To a third 8 mL vial, 10 grams of the Cu plated iron were added and the vial filled to the top with 400 ppm solution of DCC. All vials were capped with a Teflon® lined top.

At the end of 72 hours the concentration of trans-1,2-dichlorocyclohexane was determined using GC/MS techniques. The mass spectrometer was operated in EI mode and selected ion monitoring so that low detection limits could be obtained. The molecular ions of the trans-1,2-dichlorocyclohexane were monitored. The gc was an HP5890 equipped with a DB 624 0.32 mm×30 meter column. A 0.1 mL sample of water from the vial was placed into a vial containing 1 mL of hexane. One microliter of the hexane extract was injected into the gc. 2 microliters were injected for the samples containing the metals.

The results were assumed to follow a pseudo first order rate. The half-lives were calculated to be 24 hours for the Fe and <6.6 hours for the Fe plated with Cu. This was an REF of >0.73 and a rate increase of >3.6. The "<" symbol was used with the Fe plated with Cu half-life because trans-1,2-dichlorocyclohexane was below detection limits. These results show that improvements in the rate of dehalogenation occurs for halogenated alicyclic compounds.

That which is claimed is:

1. A method for dehalogenation of aqueous compositions contaminated with halogenated aliphatic and alicyclic hydrocarbons comprising:

(a) contacting an anchor metal consisting essentially of iron metal with a nonaqueous electroless plating solution comprising a soluble metal halide salt complex and a suitable solvent for a time sufficient to deposit metal derived from the soluble metal halide salt on the anchor metal to produce a mixed metal composition wherein the amount of metal derived from the soluble metal halide salt in the mixed metal composition is an amount effective to increase the dehalogenation rate compared to use of iron alone, and the surface of the mixed metal composition has exposed iron metal, and wherein the metal in the soluble salt is cobalt, copper, nickel, bismuth or lead, (b) recovering the mixed metal composition, and (c) contacting said aqueous composition with an amount of said mixed metal composition effective to dehalogenate said halogenated aliphatic and alicyclic hydrocarbons at a temperature of at least 10° C.

2. The method of claim 1 wherein the amount of metal derived from the soluble metal salt in said mixed metal composition is an amount effective to obtain a Rate Enhancement Factor of at least about 0.15.

3. The method of claim 1 wherein said soluble metal halide salt complex is a complex of a salt selected from the group consisting of cobaltous chloride, copper chloride, nickel chloride, bismuth chloride and a lead chloride with a basic nitrogen compound wherein said base nitrogen compound is a hydrochloride of a nitrogen-containing base.

4. The method of claim 3 wherein said basic nitrogen compound is selected from the group consisting of $NH_4Cl$, $H_3CNH_2 \cdot HCl$, $H_3CNH \cdot HCl$, morpholine hydrochloride, and pyridine hydrochloride.

5. The method of claim 3 wherein said salt is cobaltous chloride or copper chloride.

6. The method of claim 1 wherein said suitable solvent is dimethylsulfoxide.

* * * * *

UNITED STATES PATENT AND TRADEMARK OFFICE
CERTIFICATE OF CORRECTION

PATENT NO. : 6,217,779 B1
DATED : April 17, 2001
INVENTOR(S) : Robert G. Orth, David E. McKenzie and Sa Van Ho It is certified that error appears in the above-identified patent and that said Letters Patent is hereby corrected as shown below:

<u>Title page,</u>
Item [73], Assignee: reads "Astaris, LLC" should read -- Monsanto Company --

Signed and Sealed this

Thirty-first Day of December, 2002

JAMES E. ROGAN
*Director of the United States Patent and Trademark Office*